United States Patent [19]

Gullapalli

[11] Patent Number: 5,327,061
[45] Date of Patent: Jul. 5, 1994

[54] FORCE (TORQUE) NULLING INERTIALLY SERVOED STRUCTURAL INTERFACE

[75] Inventor: Sarma N. Gullapalli, Bethel, Conn.

[73] Assignee: Hughes Aircraft Company, Los Angeles, Calif.

[21] Appl. No.: 904,812

[22] Filed: Jun. 26, 1992

[51] Int. Cl.$^5$ .................. F16F 15/00; F16M 13/00
[52] U.S. Cl. .................. 318/649; 318/611; 248/550; 248/566
[58] Field of Search ............... 318/649, 611, 623, 114, 318/128, 460; 248/550, 562, 566, 636, 637, 638

[56] References Cited

U.S. PATENT DOCUMENTS

| | | |
|---|---|---|
| 3,703,999 | 11/1972 | Forys et al. |
| 4,033,541 | 7/1977 | Malueg . |
| 4,796,873 | 1/1989 | Schubert .................. 318/460 X |
| 4,929,874 | 5/1990 | Mizuno et al. ................. 318/128 |
| 4,935,838 | 6/1990 | Barger et al. .................. 318/649 X |
| 5,052,510 | 10/1991 | Gossman .................. 180/300 |
| 5,067,684 | 11/1991 | Garnjost .................. 248/550 |
| 5,127,622 | 7/1992 | Whelpley et al. .................. 248/550 |

*Primary Examiner*—Bentsu Ro
*Attorney, Agent, or Firm*—Michael W. Sales; Wanda K. Denson-Low

[57] ABSTRACT

Disturbing forces, such as linear forces or torques, exerted on a structural member 12 of an inertially servoed structural interface placed between two assemblies are nulled by the application of a responsive corrective inertial force or torque to the structural member. The force on the structural interface is sensed by a force sensor associated with the member. In an embodiment of the present invention for nulling linear disturbing translational forces, a servo control loop 18 is responsive to a linear translational force sensor and drives a linear actuator 22 that applies a corrective inertial linear translational force to the structural member 12 so as to null the force exerted thereon. In an embodiment of the present invention for nulling torsional disturbing forces, the servo loop 18 is responsive to a torsional force sensor 44 and drives a torque motor 42 that applies a corrective inertial torsional translational force to the structural member 12 so as to null the force exerted thereon.

16 Claims, 6 Drawing Sheets

5,327,061

FORCE (TORQUE) NULLING INERTIALLY SERVOED STRUCTURAL INTERFACE

FIELD OF THE INVENTION

The present invention relates to an apparatus for nulling disturbing forces and torques in a structural member, and more particularly, to attenuate forces or torques in a structural member by the application of a corrective inertial force or torque to the member.

DESCRIPTION OF THE PRIOR ART

Prior art active vibration isolation systems require that one side of the vibration isolation system interface be attached to a relatively massive body, such as the ground, to which vibrational forces of the active vibration isolating components are sent. However, when a massive body is not available, as occurs in space or in complex metrology stations, such vibration isolation systems are unable to isolate vibrations because they have no way to dispose of the vibrational forces. Furthermore, many active vibration isolation systems require that the associated structural member or members be soft, as in a conventional suspension system. Other devices, such as reactionless actuators, can only compensate commanded torques or forces and cannot compensate any disturbance torques or forces. An example of a conventional commercially available vibration isolation system is a an EVIS ® electronic vibration isolation system (manufactured by Newport Corp., Fountain Valley, Calif.) which utilizes active feedback to remove the effects of vibrations. The EVIS ® system is an active vibration isolation system which requires a relatively large mass (ground) to dispose of the forces. Also, the EVIS ® system cannot isolate vibration force sources, i.e. it can only isolate vibration motion sources.

The structural interface of the present invention, on the other hand, does not require that an assembly to which it is attached be massive to absorb a force or torque. It also does not require structural members to be soft. Thus the invention can be used in spacecraft or other applications where such massive structural and/or soft members may be unavailable.

SUMMARY OF THE INVENTION

The present invention relates to an apparatus for nulling disturbing forces in a structural member between two assemblies. The disturbing forces nulled may be linear or rotational. The force nulling apparatus comprises a relatively rigid structural member which may be placed between two assemblies. The structural member has an associated force sensor which senses the force exerted on the member by one of the assemblies. The force sensor outputs a signal proportional to the force sensed. The signal is received by a servo control loop circuit which proportionally drives a linear actuator connected to a small soft-mounted movable mass inside the rigid structural member. The servo loop thereby drives the linear actuator so as to create an inertial corrective force on the structural member. The corrective force is nearly equal in magnitude but opposite in direction to the force exerted on the structural member.

The torque nulling apparatus is essentially the same as the force nulling apparatus except that it senses torque rather than force. It comprises a relatively rigid structural member which may be placed between two assemblies. The member has an associated torque sensor which senses a disturbing torque exerted on the structural member. The sensor outputs a signal proportional to the torque sensed. The signal is received by a servo control loop circuit which proportionally drives a torque motor connected to a small soft-mounted rotary mass inside the rigid structural member. The servo loop thereby drives the torque motor proportionally so as to apply an inertial corrective torque in the member. The corrective torque is nearly equal in magnitude but opposite in direction to the disturbing torque.

One objective of the present invention is to provide a structural interface which will isolate force transmission between two assemblies connected by the structural interface.

Another objective of the present invention is to provide a structural interface which will isolate the transmission of torque between two assemblies connected by the structural interface.

Other objects and advantages will become readily apparent to those skilled in the art from reading the detailed description in conjunction with the claims and the drawings appended hereto.

DETAILED DESCRIPTION OF THE DRAWINGS

FIG. 3b is a block diagram of the present invention drawn for comparison to the prior art system of FIG. 3a.

FIG. 4b is a side view schematic diagram of the distributed force nulling inertially servoed structural interface shown in FIG. 4a.

DETAILED DESCRIPTION OF THE PRESENT INVENTION

Figure 1:
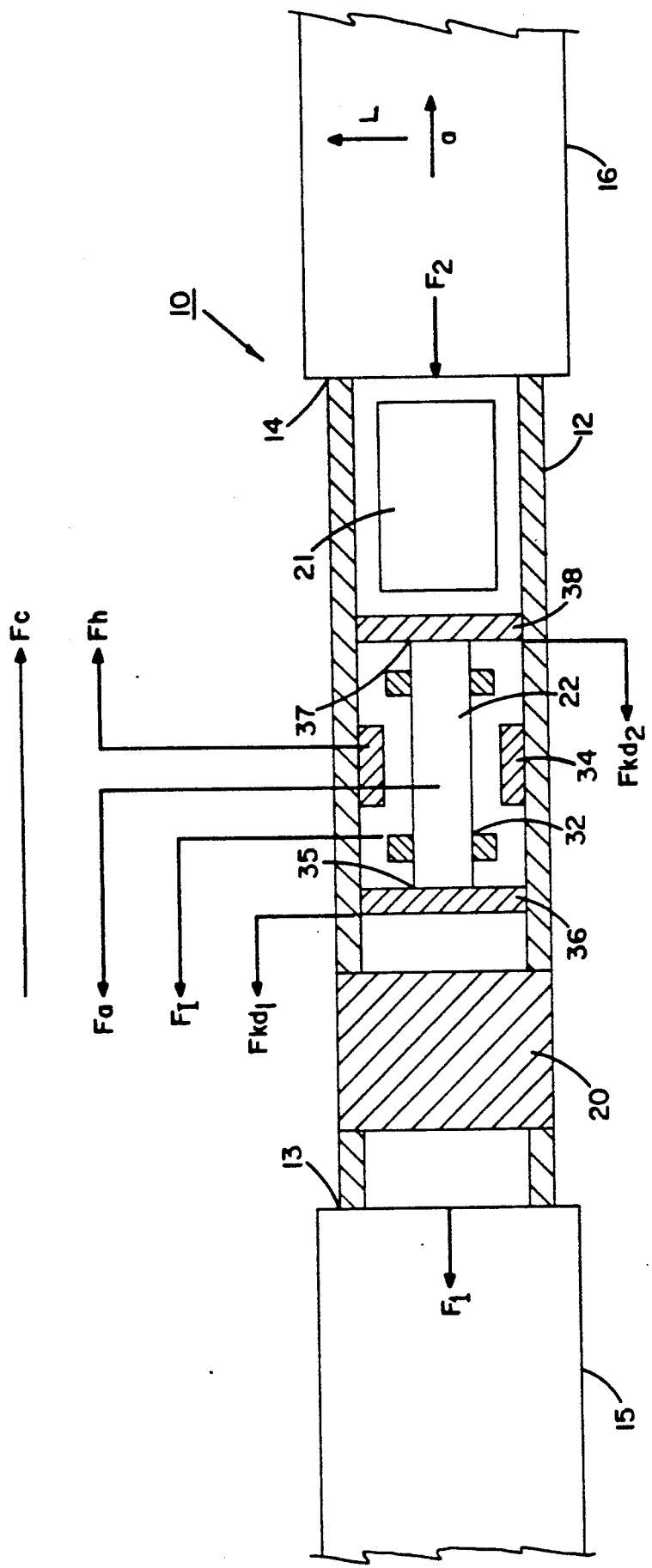
FIG. 1 is a schematic diagram of a force nulling inertially servoed structural interface of the present invention.
Figure 2:
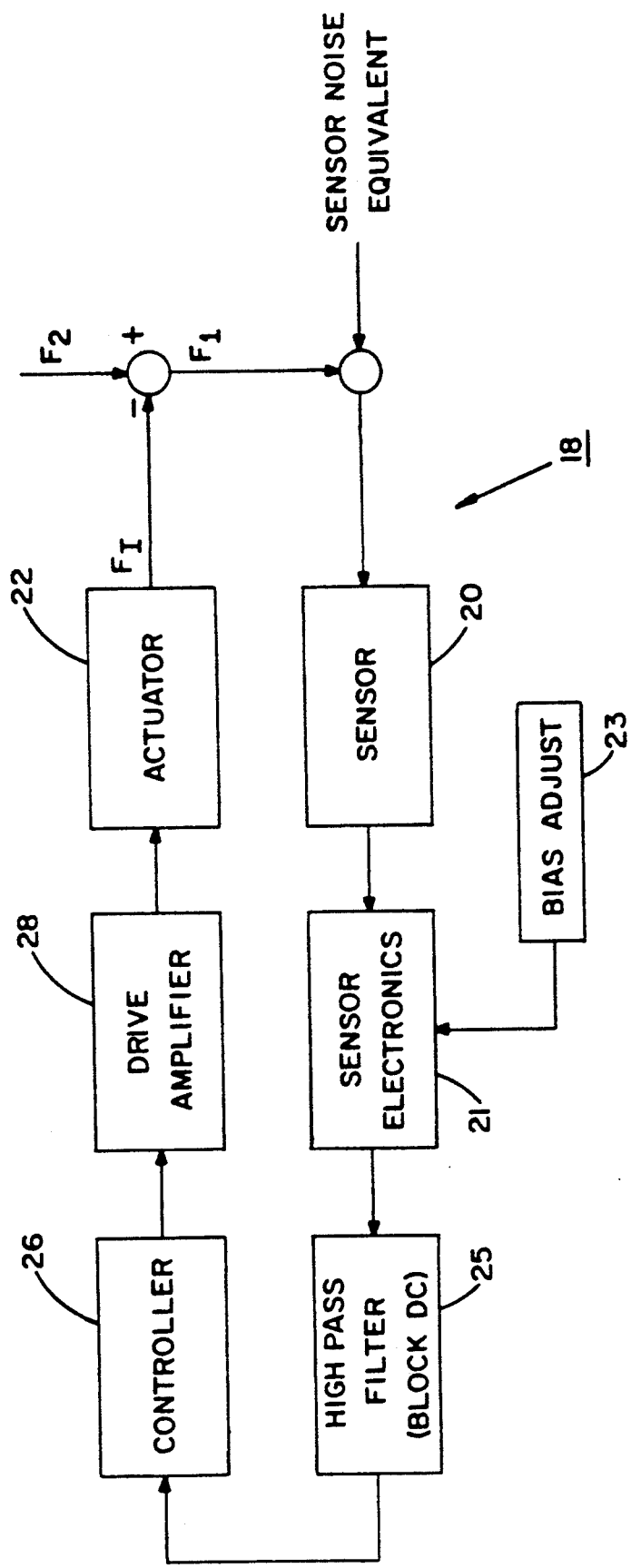
FIG. 2 is a block diagram of the servo control loop of the force nulling inertially servoed structural interface of the present invention.

FIG. 1 shows a force nulling inertially servoed structural interface 10. FIG. 2 shows a block diagram of a servo control loop of the inertially servoed structural interface shown in FIG. 1. Referring to FIGS. 1 and 2, the force nulling inertially servoed structural interface 10 comprises structural member 12 having a first end 13 and a second end 14. The first end 13 is rigidly attached to a first assembly 15 and the second end 14 is attached to a second assembly 16. The structural interface 10 nulls the transmission of a disturbance force F2 from assembly 16 to assembly 15 by the application of an inertial corrective force Fc to the structural member 12. Without the force nulling inertially servoed structural interface in place between the two assemblies 15 and 16, the force $F_1$ in assembly 15 would be equal to the force $F_2$. However, a servo control loop 18 nulls force $F_1$ by sensing $F_1$ through force sensor 20 and applying a negative feedback inertial corrective force Fc to the structural member 12 through actuator 22 with adequate loop gain over the required bandwidth of disturbing forces.

Referring to FIGS. 1 and 2, the force $F_1$ on the structural member 12 sensed by the force sensor 20 is amplified by the sensor's electronics 21. The selection of an adequate sensor and sensor electronics is based on the specific requirements for a given application. However, the operating parameters that should be considered when selecting a device as an adequate force sensor include the sensitivity, dynamic range, noise and stiffness of the sensing device. The force sensing function of the force sensor 20 may be performed, for instance, by piezoelectric sensors, eddy current displacement sensors, diode laser gauges, or accelerometers. To make the best use of the dynamic range of the sensor 20, a bias adjustment 23 is provided in the servo loop 18 to cancel any static load carried by the structural member 12. Also, the DC component of the sensor signal is removed by a high pass filter 25 in order to relieve the linear actuator. The bias adjust 23 of the sensor electronics is present to avoid sensor electronics saturation due to a bias (D.C.) component of the force in the structural member 12. The high pass filter 25 removes any remaining D.C. and very low frequency components so as to prevent the actuator from being unnecessarily driven by these components. After high pass filtering the DC component of the sensor signal, the signal is filtered through a controller 26 designed to stabilize the servo loop and provide the desired loop gain versus frequency characteristics. The filtered signal from the controller 26 is then fed into drive amplifier 28 to drive the linear actuator 22 which results in the application of inertial corrective force Fc on the structural member 12.

The actuator 22, which may comprise a typical voice-coil linear actuator, includes a moving part 32 having an inertial mass which may be augmented by additional mass if required. The moving part 32 is attached to housing 34 by a pair of springs 36 and 38 with some damping, if necessary, connected to opposite axial ends 35 and 37 of the actuator 22. The springs 36 and 38 are designed to be soft in the axial direction a and stiff in the lateral direction 1.

During operation, actuator force Fa is proportional to the signal from drive amplifier 28. The actuator force Fa results in the application of a force Fh on the housing 34 and on the structural member 12. The magnitude of Fh is equal to force Fa, but the force acts in the opposite direction. The actuator force Fa is also equal to the sum of spring and damper forces $Fkd_1$ and $Fkd_2$ of the springs 36 and 38, and inertial force $F_I$ of the moving part 32 ($Fa = Fkd_1 + Fkd_2 + F_I$). Thus, the net corrective force Fc acting on the structural member 12 due to the actuator force Fa is the sum of the force acting on the housing Fh and the spring and damper forces $Fkd_1$ and $Fkd_2$ of the springs ($Fc = Fh + Fkd_1 + Fkd_2$, where spring and damper forces $Fkd_1$ and $Fkd_2$ are directed opposite of Fh). Therefore, the net corrective force Fc acting on the structural member due to the actuator movement is $-F_I$, the reaction of the inertial force component alone. The axial softness of the springs 36 and 38 ensure that $F_I$ is the major component of Fa.

Thus, closing the force nulling servo loop, force $F_1$ on assembly 15 is the difference between force $F_2$ and inertial force $F_I$ ($F_1 = F_2 - F_I$). Accordingly, as shown in FIG. 2, the loop will null force $F_1$ by the application of corrective force Fc to the structural member 12 which is attached between assembly 15 and assembly 16. Residual forces on assembly 15 may be attributable to sensor noise equivalents and force components uncompensated by the present invention. However, the residual force will be much smaller than the actual magnitude of the residual force and will depend on the specific application.

Unlike other devices which depend on the entire reaction force Fh to be absorbed and which inturn require that assembly 16 be relatively massive, the present invention does not require either assembly 15 or assembly 16 to be massive. The size of the inertial mass on the actuator 22 is determined by the magnitude of the disturbance forces to be nulled, such as $F_2$, and the disturbance spectrum (magnitude vs frequency). Therefore, the present invention can be used effectively in small or large assemblies or in space applications where no relatively massive body may be available for grounding forces.

Figure 3B:
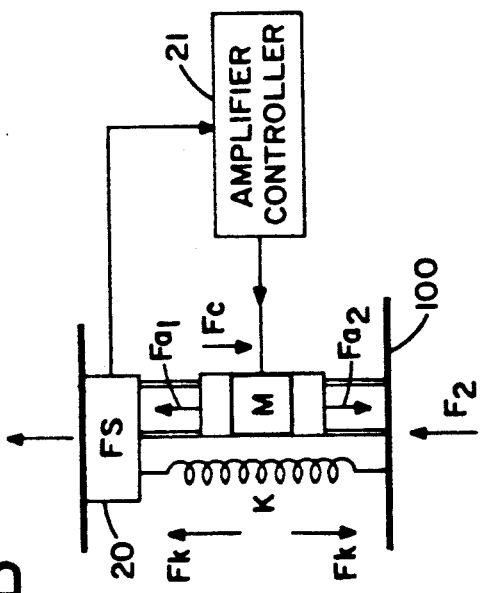
Figure 3A:
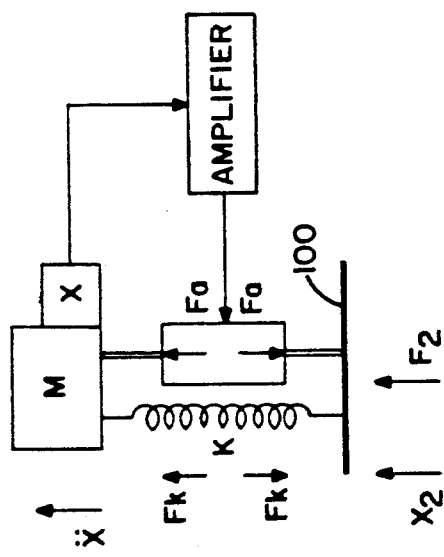
FIG. 3a is a block diagram of the prior art vibration isolation system that is compared to the servoed structural interface of the present invention.

FIG. 3a shows a prior art vibration isolation system. Its governing force equations are shown in Table 1. A force transducer acts on the surface which has Mass M, with force Fa, with an equal and opposite force Fa acting on a support 100 (action and reaction of the force transducer). This action is typical of all existing active vibration isolation system such as that shown in FIG. 3a. The consequence of these prior art systems is that any force input $F_2$ from the support (i.e. when boundary condition is a given force) is transmitted unattenuated to the top surface.

Force cancellation at mass M is achieved when the disturbance from the support 100 is a displacement motion, in which case $F_2$ is not at a given boundary condition, and as shown in FIG. 3a, the acceleration of mass M is indeed attenuated by active mass G. FIG. 3b shows the present invention for comparison to the prior art system of FIG. 3a. The governing force equations are shown in Table 2. The actuator force does not directly act on the top surface. Rather, it acts on mass M inside the rigid structural member (interface). This difference between the prior art system and the force nulling inertially servoed structural interface is fundamental because with the present invention it is possible for the net actuator force on the top surface $Fa_1$ to be different from that on the bottom surface $Fa_2$. The control servo force is not reactive against the support, but against the inertial reference. The consequence is that force $F_2$ is not transmitted as such to the top surface, as it is reduced by the inertial servo force Fc.

Figure 4C:
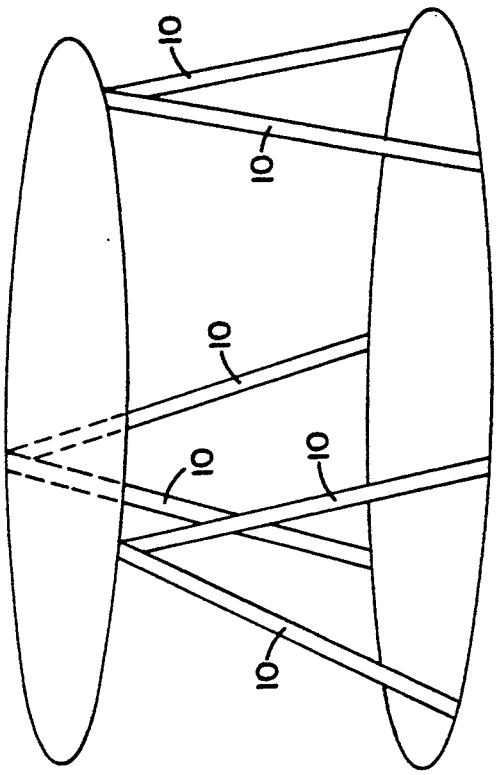
FIG. 4c is a schematic diagram of a force and torque nulling structural interface having six degrees of freedom.
Figure 4A:
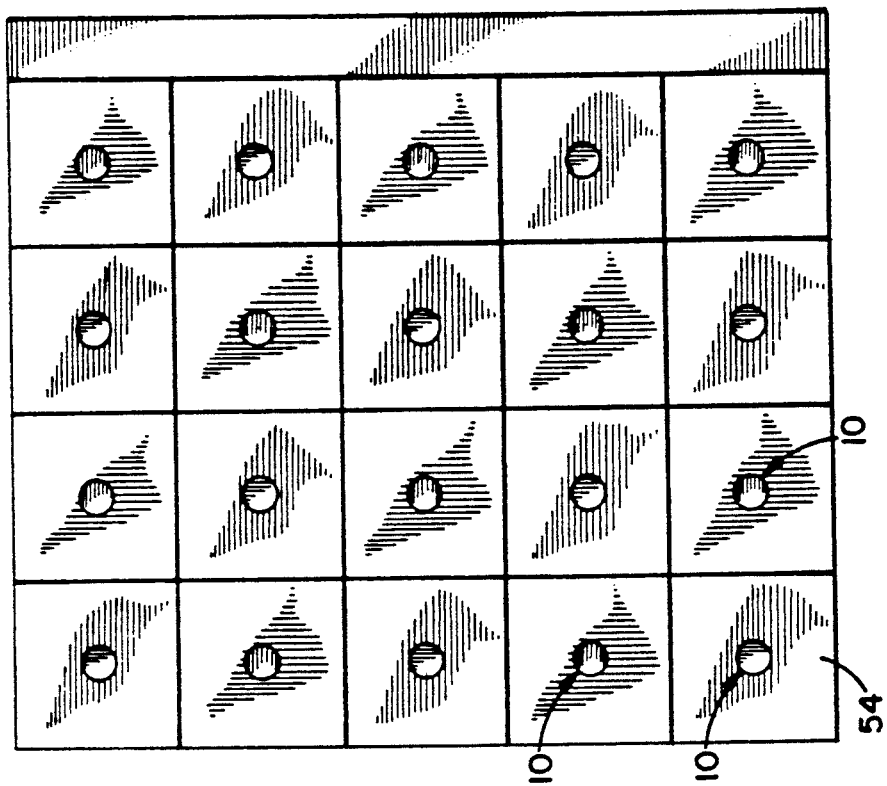
FIG. 4a is a front schematic diagram of the distributed force nulling inertially servoed structural interface.
Figure 4B:
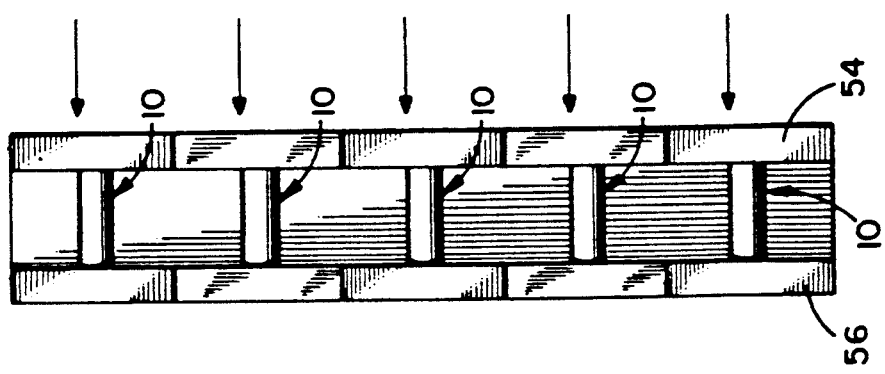

FIGS. 4a and 4b show a distributed force nulling inertially servoed structural interface. The distributed interface 50 comprises a plurality of the force nulling inertially servoed structural interfaces 10 distributed between a plurality of panels 54 receptive to a distributed force field and a plurality of panels 56 on a load side. The effect of the distribution is to null a distributed force field, such as acoustic pressure, so that the force does not reach the load side 56.

FIG. 4c shows an arrangement of six force nulling inertially servoed structural members between Assembly 1 and Assembly 2 that provide isolation of Assembly 1 in six degrees of freedom from the disturbance forces and torques of Assembly 2. Since each of the six force nulling inertially servoed structured members nulls the disturbance force components through itself, the vector sum of all six disturbance forces is also nulled. Since the six disturbance force vectors cover all six degrees of freedom, the isolation is achieved in all six degrees of freedom.

Figure 5:
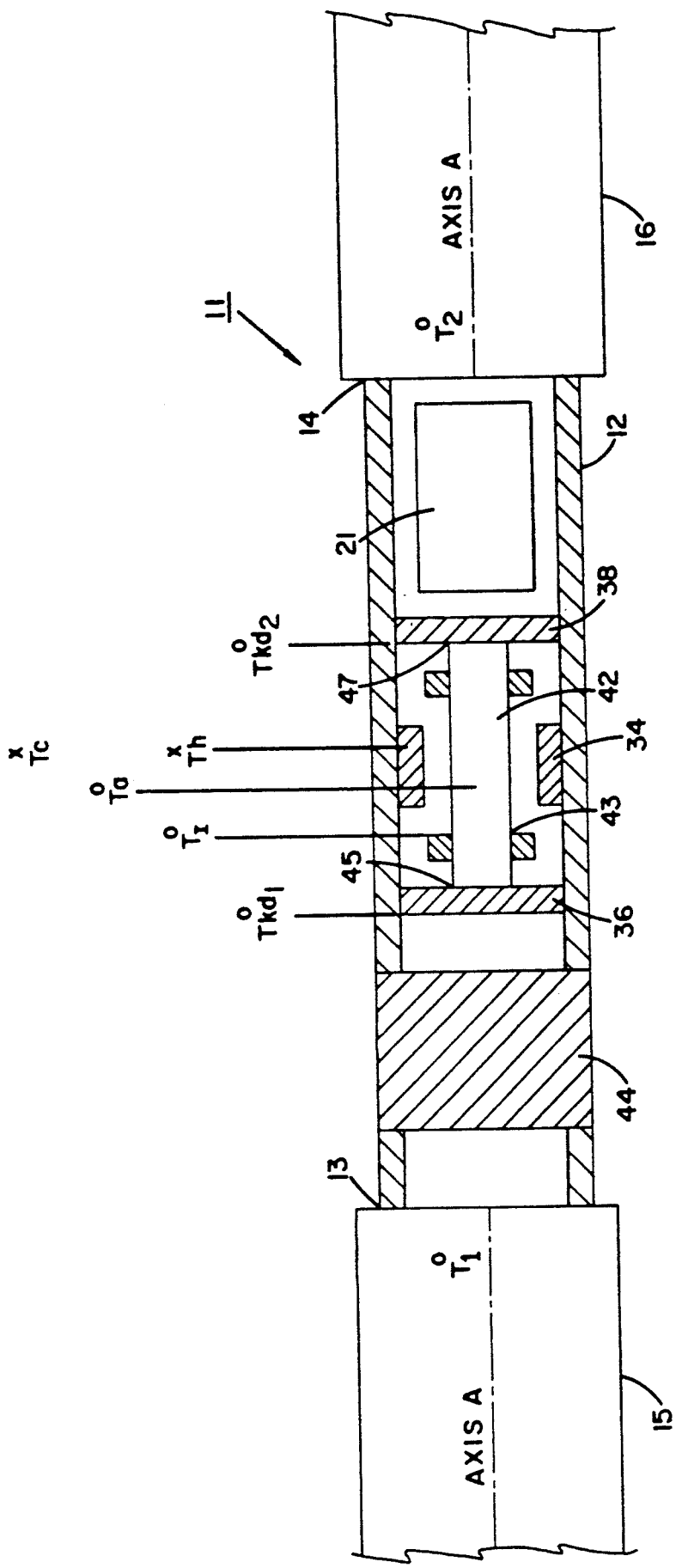
FIG. 5 is a schematic diagram of the torque nulling inertially servoed structural interface of the present invention.
Figure 6:
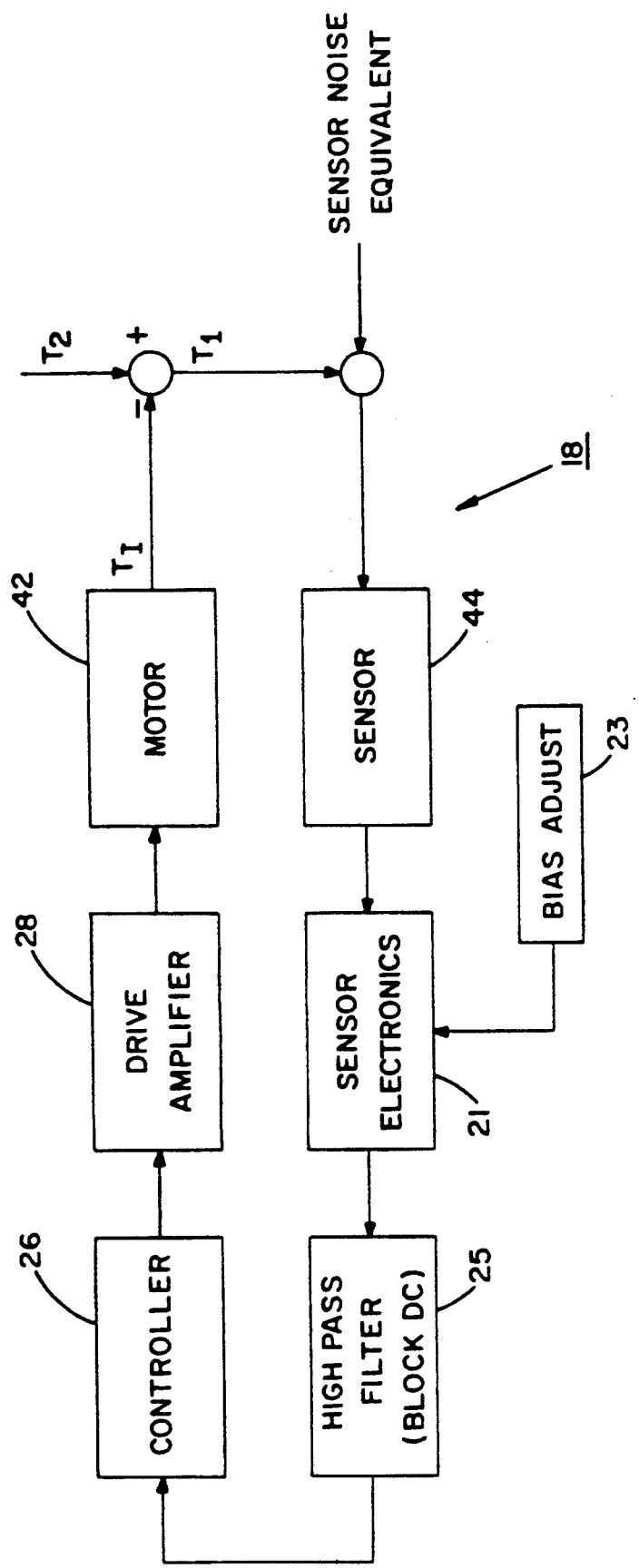
FIG. 6 is a block diagram of the servo control loop of the torque nulling inertially servoed structural interface of the present invention.

FIGS. 5 and 6 show a torque nulling inertially servoed structural interface. The construction of the torque nulling inertially servoed structural interface 11 is very similar to construction of the force nulling embodiment 10 and both embodiments essentially work in the same way. In the torque nulling embodiment 11, the linear actuator 22 of the force nulling embodiment 10 is replaced by a motor 42 having a shaft 43 with ends 45 and 47 connected to the springs 36 and 38 and the force sensor 20 is replaced by a torque sensor 44.

Referring to FIGS. 5 and 6, the structural interface 11 nulls torque $T_1$ about axis A by sensing $T_1$ through the torque sensor 44 and by applying a negative feedback inertial torque Tc about axis A on the structural member 12 through the motor 42 and shaft 43 with adequate loop gain over the required bandwidth. The torque on the structural member is sensed by the torque sensor 44. The selection of an adequate torque sensor 44 is also based on the specific requirements of a given application. Operating parameters of a torque sensor that should be considered when selecting an adequate torque sensor include the sensitivity, dynamic range, noise and stiffness of the sensing device. Piezo-electric sensors, eddy current displacement sensors, laser diode gauges or accelerators are sensors which may be used to fill the torque sensing function. To make the best use of the dynamic range of the torque sensor 44, the bias adjustment 23 in the servo loop 18 allows the cancellation of any static torque carried by the structural member 12. Also, the DC component of the sensor signal is filtered by a high pass filter in order to relieve the motor of biases torques which do not contribute to servo action. Thus, during operation motor torque Ta is proportional to the compensated error signal from drive amplifier 28. The motor torque Ta results in a torque Th on the housing 34 and on the structural member 12. The magnitude of Th is equal to Ta but is opposite in direction.

The applied motor torque Ta is also equal to the sum of spring and damper torques $Tkd_1$ and $Tkd_2$ of the springs 36 and 38, and inertial torque $T_I$ of the motor ($Ta = Tkd_1 + Tkd_2 + T_I$). Thus the net torque acting on the structural member 12 due to the motor torque Ta is the sum of the torque acting on the housing Th and the spring and damper torques $Tkd_1$ and $Tkd_2$ of the springs. Therefore, the net torque acting on the structural member due to the motor is $-T_I$, which is the reaction of the inertial component alone. The softness of the springs 36 and 38 ensures that $T_I$ is a major part of Ta. Thus, closing the torque nulling servo loop, torque $T_1$ on assembly 14 is the difference between torque $T_2$ and inertial torque $T_I$($T_1 = T_2 - T_1$). Accordingly, as shown in FIG. 3, the loop will null torque $T_1$ by applying corrective torque Tc. Residual torques on assembly 14 may be attributable to sensor noise equivalents and torque components uncompensated by the present invention. However, the residual torques will be much smaller than $T_2$ and the actual magnitude will depend on the specific application.

Thus, what has been described is a disturbing force nulling (torque) inertially servoed structural interface where a corrective inertial force and/or corrective inertial torque is applied to the structural number to null the force or torque exerted on the member.

TABLE 1

PRIOR ART SYSTEM

FORCE EQUATIONS:
1) $M\ddot{x} = Fk + Fa$
2) $F2 = Fk + Fa$
3) $Fa = -G\ddot{x}$ where
Fk = spring force
Fa = actuator force
G = sensor/amplifier/actuator gain
F2 = external force Case 1) F2 is the forcing function:
From equations 1 and 2, $M\ddot{x} = F2$, regardless of Fa (i.e.,
Force F2 is transmitted right through, and system has no effect).
Case 2) X2 is the forcing function ("support amplitude")
From equations 1 and 3, $\ddot{x} = Fk/(M+G)$ (G = "active mass") and $Fk = K(x - X2) = KX2$ since X is small.

TABLE 2

FORCE NULLING INTERITAL SERVO CONCEPT

FORCE EQUATIONS:
1) $Fs = -Fk - Fa1$
2) $F2 = Fk + Fa$
3) $Fa_1 = Fa_2 + Fc$
4) $Fc = G\, Fs$ where
Fs = force sensed by the force sensor (Note: Fc is inertial force used in the servo loop)
G = sensor/amplifier/controller/actuator gain
From equations 1, 2 and 3, $Fs = -F2 - Fc$ and from equation 4, $Fs = -F2/(1+G)$
Thus, external force F2 is nulled by the inertial servo force.

What is claimed is:

1. An apparatus for nulling the transmission of disturbing forces through a structural member disposed between first and second assemblies by application of a corrective inertial force on said structural member, said apparatus comprising:
   means for sensing said disturbing force transmitted from the first assembly to said structural member, wherein said means for sensing further includes means for outputting a signal proportional to said disturbing force on said structural member;
   means for applying said corrective inertial force to said structural member so as to null transmission of the disturbing force from the first assembly through said structural member to the second assembly, wherein the applied corrective inertial force is proportional to the output signal of said means for sensing the disturbing force.

2. The apparatus of claim 1, wherein the disturbing force sensing means is a linear translational force sensing means.

3. The apparatus of claim 1, wherein the disturbing force sensing means is a rotational force sensing means.

4. The apparatus of claim 1 wherein the disturbing force sensing means is a piezo-electric sensor.

5. The apparatus of claim 1 wherein the disturbing force sensing means is an eddy current displacement sensor.

6. The apparatus of claim 1 wherein the disturbing force sensing means is a strain gauge.

7. The apparatus of claim 1 wherein the disturbing force sensing means is a laser gauge.

8. The apparatus of claim 1, wherein the disturbing force sensing means is an accelerometer.

9. The apparatus of claim 1, wherein the corrective inertial force applied is a linear inertial translational force.

10. The apparatus of claim 9, wherein the means for applying said linear inertial translational force is by movement of a linear actuator having an inertial mass associated therewith and having a first axial end and a second axial end connected to said structural member by a first spring connected between said first axial end and the structural member and a second spring connected between said second axial end and the structural member.

11. The apparatus of claim 1, wherein the corrective inertial force applied is a rotational inertial torque.

12. The apparatus of claim 11, wherein the means for applying said rotational inertial torque includes a shaft of an electric motor having an inertial mass associated therewith, wherein said shaft has a first axial end and a second axial end connected to said structural member by a first spring connected between the structural member and said first axial end and a second spring connected between the structural member and said second axial end.

13. The apparatus of claim 1, wherein the means for sensing said disturbing force and the means for applying said corrective inertial force are housed within said structural member.

14. An apparatus for nulling the transmission of disturbing translational force through a structural member disposed between first and second assemblies by application of a corrective inertial translational force on said structural member, said apparatus comprising:
- a disturbing translational force sensor positioned within said structural member for sensing said disturbing translational force transmitted from the first assembly to said structural member, and wherein said sensor further includes means for outputting a signal proportional to said disturbing translational force;
- means for application of a corrective inertial translational force wherein said application means has an inertial mass associated therewith, and said application means further includes a first axial end and a second axial end, wherein said first axial end is connected to said structural member by a first spring member and said second axial end is connected to said structural member by a second spring member, wherein said application means applies said corrective inertial translational force to said structural member through said spring members; and
- an electronic control circuit electrically connected to said sensor signal output means so as to output a second signal to said means for application of a corrective inertial translational force such that said application means applies said corrective inertial translational force proportionally responsive to said disturbing translation force so as to null the transmission of said force from the first assembly through said structural member to the second assembly.

15. An apparatus for nulling the transmission of disturbing torque through a structural member disposed between first and second assemblies by application of a corrective inertial torque on said structural member, said apparatus comprising:
- a disturbing torque sensor positioned within said structural member for sensing said disturbing torque transmitted from the first assembly to said structural member, and wherein said sensor further includes means for outputting a signal proportional to said disturbing torque;
- means for application of a corrective inertial torque wherein said application means has an inertial mass associated therewith, and said application means further includes a first axial end and a second axial end, wherein said first axial end is connected to said structural member by a first spring member and said second axial end is connected to said structural member by a second spring member, wherein said application means applies said corrective inertial torque to said structural member through said spring members; and
- an electronic control circuit electrically connected to said sensor signal output means so as to output a second signal to said means for application of a corrective inertial torque such that said application means applies said corrective inertial torque proportionally responsive to said disturbing torque so as to null transmission of said torque from the first assembly through said structural the member to the second assembly.

16. A distributed inertially servoed force nulling structural interface comprising a plurality of apparatus for nulling the transmission of disturbing translational forces through a structural member thereof disposed between a first plurality of adjacent panels and a second plurality of adjacent panels, wherein each panel of said first and second plurality has one of said apparatus associated therewith, and wherein said apparatus further comprises:
- a disturbing translational force sensor contained internally by said structural member for sensing said disturbing translational force transmitted from an associated first panel to said structural member, and wherein said sensor further includes means for outputting a signal proportional to said disturbing translational force;
- means for application of a corrective inertial translational force, wherein said application means has an inertial mass associated therewith, and said application means further includes a first axial end and a second axial end, wherein said first axial end is connected to said structural member by a first spring member and said second axial end is connected to said structural member by a second spring member, and wherein said application means applies said corrective inertial translational force to said structural member through said spring members; and
- an electronic control circuit electrically receptive to said sensor signal output so as to output a second signal to said means for application of a corrective inertial translational force such that said application means applies said corrective inertial translational force proportionally responsive to said disturbing translation force so as to null the transmission of said force from the associated first panel through said structural member to the associated second panel.

* * * * *